US012782149B2

(12) United States Patent
Di Lorenzo et al.

(10) Patent No.: US 12,782,149 B2
(45) Date of Patent: Nov. 3, 2026

(54) SYSTEMS AND METHODS FOR ROUTE ENHANCEMENT

(71) Applicant: Verizon Patent and Licensing Inc., Basking Ridge, NJ (US)

(72) Inventors: David Di Lorenzo, Florence (IT); Tommaso Bianconcini, Florence (IT)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 270 days.

(21) Appl. No.: 18/060,872

(22) Filed: Dec. 1, 2022

(65) Prior Publication Data

US 2024/0068824 A1 Feb. 29, 2024

(30) Foreign Application Priority Data

Aug. 29, 2022 (IT) ........................ 102022000017715

(51) Int. Cl.
*G01C 21/34* (2006.01)

(52) U.S. Cl.
CPC ....... *G01C 21/3453* (2013.01); *G01C 21/343* (2013.01)

(58) Field of Classification Search
CPC . G01C 21/3453; G01C 21/343; G06Q 10/047
USPC .......................................................... 701/411
See application file for complete search history.

(56) References Cited

U.S. PATENT DOCUMENTS

| | | | | |
|---|---|---|---|---|
| 11,181,387 | B2 * | 11/2021 | Judka | G01C 21/3476 |
| 12,093,508 | B1 * | 9/2024 | Chen | G01C 21/343 |
| 2008/0147473 | A1 | 6/2008 | Zhong et al. | |
| 2015/0285651 | A1 | 10/2015 | Cerecke et al. | |
| 2016/0232475 | A1 * | 8/2016 | Kuehnle | G06Q 10/06398 |
| 2020/0271463 | A1 * | 8/2020 | Lear | G01C 21/343 |
| 2020/0364652 | A1 * | 11/2020 | Rongley | G01C 21/3415 |
| 2022/0011124 | A1 * | 1/2022 | Yamamoto | G09B 29/10 |
| 2022/0397403 | A1 * | 12/2022 | Bickley | G06Q 10/08355 |
| 2023/0281551 | A1 * | 9/2023 | Sun | G06Q 10/08355 705/330 |

FOREIGN PATENT DOCUMENTS

| | | |
|---|---|---|
| WO | 2020/263177 | 12/2020 |

* cited by examiner

*Primary Examiner* — Hitesh Patel
*Assistant Examiner* — Ashleigh Nicole Turnbaugh

(57) ABSTRACT

A routing optimization system may determine a plurality of routes based on one or more changes to an initial route. Each change generates a respective route of the plurality of routes. The routing optimization system may store route information for each route. The route information, for each route, includes cost information identifying a cost associated with the route. The route information is stored in a respective entry of a data structure. The routing optimization system may determine that a particular route, associated with a lowest cost out of costs associated with the plurality of routes, is to be selected from the plurality of routes. The routing optimization system may determine whether an entry, of a plurality of entries associated with the plurality of routes, is empty. The routing optimization system may select the particular route based on the plurality of entries after determining that the entry is not empty.

20 Claims, 9 Drawing Sheets

SYSTEMS AND METHODS FOR ROUTE ENHANCEMENT

CROSS-REFERENCE TO RELATED APPLICATION

This application claims priority to Italian Application No. 102022000017715, filed on Aug. 29, 2022, entitled "SYSTEMS AND METHODS FOR ROUTE ENHANCEMENT," which is hereby expressly incorporated by reference herein.

BACKGROUND

A fleet of vehicles may be used to deliver goods and/or provide services. Determining the best routes for the fleet of vehicles is often a major concern for fleet managers. The routes may need to be determined based on different constraints such as fuel consumption, travel time, and/or an amount of emission of the fleet of vehicles.

DETAILED DESCRIPTION OF PREFERRED EMBODIMENTS

Figure 1A:
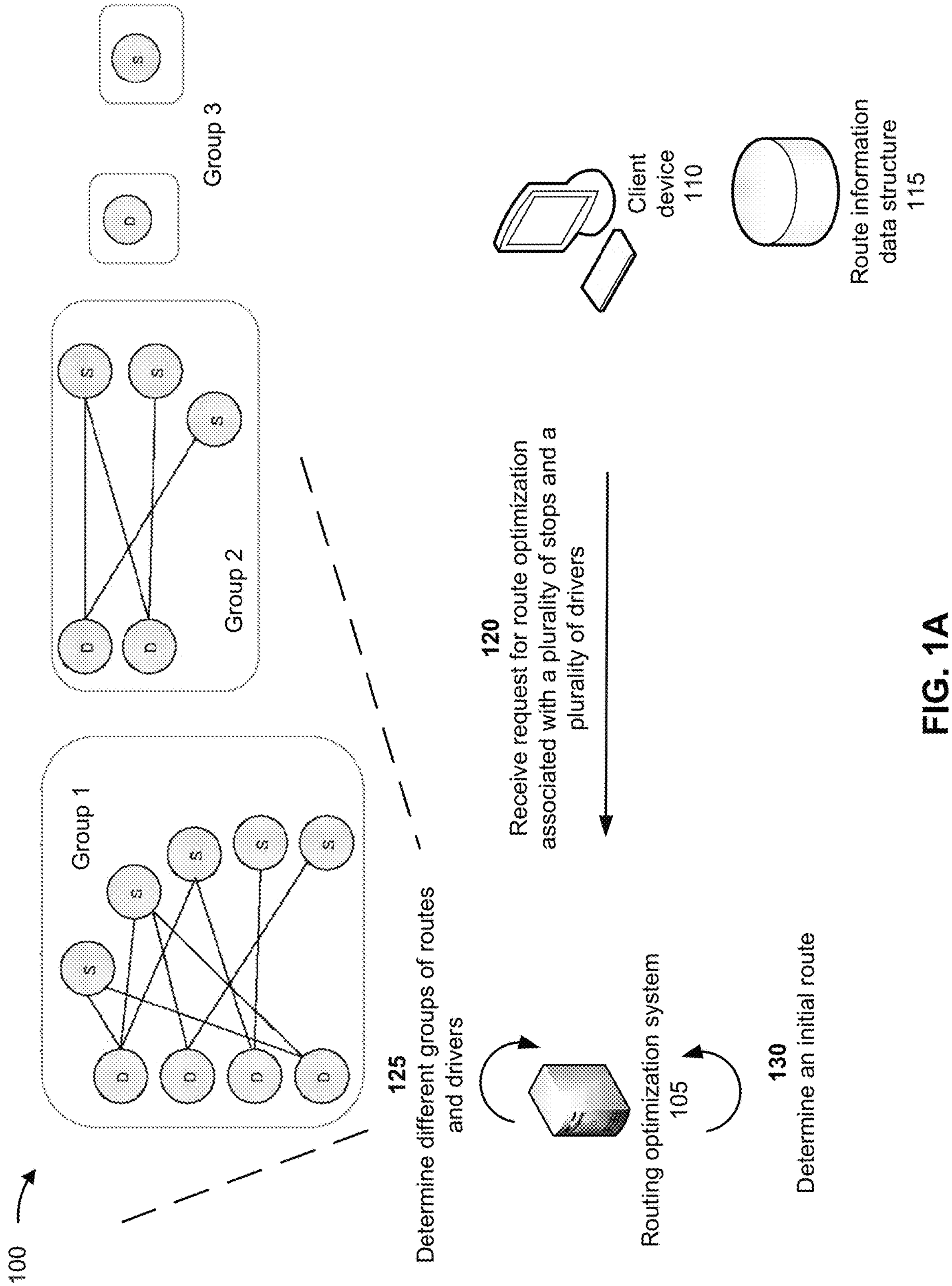
FIGS. 1A-1F are diagrams of an example associated with route enhancement.

The following detailed description of example implementations refers to the accompanying drawings. The same reference numbers in different drawings may identify the same or similar elements.

Vehicle routing systems schedule a set of stops among a fleet of vehicles while attempting to minimize operational costs of routes associated with the set of stops (e.g., a set of geographical locations). The operational costs of a route may include a mileage or a distance associated with the route, an overall duration associated with the route, and/or an amount of fuel consumption for the route, among other examples. In some instances, a local search algorithm may be used to determine the routes associated with the set of stops with the goal of reducing operational costs. An example of the local search algorithm may be a Tabu search algorithm.

However, using the local search algorithm to determine routes is a computationally intensive task. For example, the local search algorithm involves numerous iterations of generating multiple routes and evaluating the routes. For instance, during each iteration, the local search algorithm will generate multiple routes that include different combinations of stops and evaluating the routes to identify a route associated with a lowest operational cost. In some instances, a route identified during a first iteration may be similar to a route identified during a second iteration. In this regard, computations performed during the first iteration may be same or similar to computations performed during the second iteration. In other words, the computations may be duplicative. Accordingly, such computations may unnecessarily consume computing resources.

In some instances, during an iteration, the local search algorithm may modify a first route by moving a stop from a second route to the first route. Such a move may generate an undesirable and inefficient route if the stop is a threshold distance away from stops included in the first route. Accordingly, such a change may unnecessarily consume computing resources.

In some instances, the first route and the second route may include a same subset of stops. The second route may be generated by changing an order of the subset of routes in the first route. Such a move may not generate an improved route, with respect to the first route, if the subset of stops are sequential and if the subset of stops are within a distance threshold of each other. Accordingly, such a change may unnecessarily consume computing resources.

In some situations, the local search algorithm may be used to evaluate a large number of stops and a large number of drivers. Processing such large numbers of stops and drivers as a whole is a time consuming task. Accordingly, for at least the foregoing reasons, using the local search algorithm in this manner consumes computing resources, storage resources, and/or network resources, among other examples.

Implementations described herein are directed to reducing a quantity of computations and reducing an amount of time associated with determining an optimal route (e.g., a route associated with a lowest computational cost). For example, implementations described herein involve storing changes, of a particular type of change, in a data structure to prevent performing duplicative computations. Implementations described herein involve identifying multiple groups of stops and drivers (or vehicles), with each group being associated with a respective geographical location. Additionally, or alternatively, implementations described herein involve avoiding moving a stop from a first route to a second route when a distance between the stop and stops of the second route satisfies a distance threshold.

By reducing the quantity of computation and reducing the amount of time associated with determining an optimal route as described herein, implementations described herein may preserve computing resources, storage resources, network resources, among other examples, that would have otherwise been consumed by the local search algorithm described above.

FIGS. 1A-1F are diagrams of an example implementation 100 associated with route enhancement. As shown in FIGS. 1A-1F, example implementation 100 includes a routing optimization system 105, a client device 110, and a route information data structure 115. These devices are described in more detail below in connection with FIG. 2 and FIG. 3.

Routing optimization system 105 may include one or more devices capable of receiving, generating, storing, processing, and/or providing information associated with determining routes based on information regarding stops and information regarding drivers, as described in more detail below. In some implementations, routing optimization system 105 may determine the routes as a result of multiple iterations of determining different combinations of stops and determining a cost associated with each combination of stops.

During an iteration, routing optimization system 105 may perform all possible changes, of a first type of change of a plurality of types of changes, on a current route; perform all possible changes, of a second type of change of the plurality of types of changes, on the current route; and so on. All possible changes, of a type of change, may be referred to as a "neighborhood."

Routing optimization system 105 may determine a route for each change performed and may determine a cost (e.g., an operational cost) associated with each route. Each route may be associated with a driver and/or a vehicle associated with the driver. Routing optimization system 105 may determine a cost associated with a route based on a distance associated with the route, a travel time associated with the route, a cost of a driver associated with the route, a cost of a vehicle associated with driver, among other examples. During each iteration, a route associated with a lowest cost may be referred to as a "solution." The cost of the driver may include a salary of the driver, a salary bonus provided to the driver, healthcare benefits provided to the driver, and/or one or more types of insurance policies provided to the driver, among other examples.

The plurality of types of changes may include changes associated with inverting a sequence of stops, swapping an order of two stops, removing a stop from a route and including the stop in a set of unassigned stops, inserting a stop (from the set of unassigned stops) in the route, and/or moving a stop from the current route to another route (or vice versa), among other examples. An unassigned stop is a stop that is not included in any route.

Client device 110 may include one or more devices capable of receiving, generating, storing, processing, and/or providing information associated with determining routes. For example, client device 110 may provide, to routing optimization system 105, requests for one or more routes associated with multiple stops and one or more drivers. Client device 110 may receive, from routing optimization system 105, information regarding the one or more routes.

Route information data structure 115 may include a data structure (e.g., a database, a table, and/or a linked list) that stores route information of routes determined by routing optimization system 105 during each iteration. The route information, for each route, includes cost information identifying a cost associated with the route. Additionally, the route information, for each route, is stored in a respective entry of the data structure.

As shown in FIG. 1A, and by reference number 120, routing optimization system 105 may receive a request for route optimization associated with a plurality of stops and a plurality of drivers. The request may be received from client device 110. For example, a user of client device 110 may desire to determine one or more optimal routes associated with the plurality of stops and the plurality of drivers. Accordingly, the user may submit the request using client device 110.

The request may include information identifying the plurality of stops, information identifying the drivers, and/or information identifying vehicles associated with the drivers, among other examples. As an example, a first vehicle may be associated with a first driver, a second vehicle may be associated with a second driver, and so on.

The information identifying a stop, of the plurality of stops, may include information identifying a geographical location (e.g., an address, geographical coordinates, among other examples). The information identifying a driver, of the plurality of drivers, may include a name of the driver, wages of the driver, a geographical area associated with the driver, working hours of the driver, among other examples.

The information identifying a vehicle, of the plurality of vehicles, may include a vehicle identification number of the vehicle, information identifying a cost associated with operating the vehicle (e.g., fuel cost and/or maintenance cost), information identifying a capacity of the vehicle, among other examples. The information identifying the capacity of the vehicle may indicate one or more operations that may be performed by the vehicle, one or more types of services to be performed using the vehicle, a payload capacity of the vehicle, among other examples.

In some implementations, the request may include one or more constraints associated with the request. The one or more constraints may include a period of time for servicing the plurality of stops, a maximum duration of a route, a period of time for a break for a driver, a desired compatibility between a service to be performed at the stop and a capacity of a vehicle and/or a driver, among other examples.

A vehicle may be compatible with a stop if the vehicle can be used to service the stop. A driver may be compatible with a stop if the stop can potentially be serviced by the driver. A service may include a delivery service (e.g., to deliver items), a pickup service (e.g., to pick items), a repair service, a maintenance service, and/or an installation service, among other examples. In this regard, servicing a stop may refer to performing one or more of the services at the stop.

As shown in FIG. 1A, and by reference number 125, routing optimization system 105 may determine different groups of routes and drivers. For example, after receiving the request, routing optimization system 105 may determine a first group of routes and drivers, a second group of routes and drivers, and so on. In order to determine the different groups, routing optimization system 105 may determine whether a driver is compatible with a stop. A driver is compatible with a stop if the stop can potentially be serviced by the driver.

Conversely, a driver is not compatible with a stop if an amount of time for the driver to travel to the stop, service the stop, and return to a departure location of the driver is greater than a total allowable driving or working time. Additionally, or alternatively, a driver is not compatible with a stop if a capacity associated with the stop exceeds a capacity associated with a vehicle of the driver (e.g., a payload to be picked at the stop exceeds a payload capacity of the vehicle).

Additionally, or alternatively, a driver is not compatible with a stop if the stop requires some skills which the driver does not possess. Additionally, or alternatively, a driver is not compatible with a stop if the stop is not included in a geographical area associated with the driver. Additionally, or alternatively, a driver is not compatible with a stop if a period of time associated with servicing the stop is not included in working hours of the driver.

After determining compatibility between drivers and stops (and/or incompatibility between drivers and stops), routing optimization system 105 may generate a graph (e.g., a symmetric graph) that includes a plurality of nodes. Each driver and each stop may be represented by a respective node of the plurality of nodes. Routing optimization system 105 may provide a connection between a node associated with a driver and a node associated with a stop that are compatible for each possible pair of nodes. The connection may be an edge or an arc.

Routing optimization system 105 may determine connected components of the graph. Connected components may refer to disjoint sets of nodes which can all be reached from one another using the edges of the graph, and none of which can reach any node of other disjoint sets of nodes. For example, a connected component may include one or more pairs of nodes representing one or more pairs of drivers and nodes that are compatible. Each node, of the connected component, can be reached by one or more other nodes of the connected component. Each connected component, of the connected components, may be from a group of drivers and stops.

By determining the different groups in this manner and determining routes for each of the different groups, routing optimization system 105 may preserve computing resources, storage resources, network resources, among other examples, that would have otherwise been consumed by considering all drivers and stops as a whole.

As shown in FIG. 1A, and by reference number 130, routing optimization system 105 may determine an initial route. For example, routing optimization system 105 may determine the initial route based on a plurality of stops and a plurality of drivers included in one of the groups determined above in connection with reference number 125. For example, routing optimization system 105 may determine different routes based on different combinations of the plurality of stops. In some implementations, during a first iteration, routing optimization system 105 may determine a plurality of routes based on all possible combinations of the plurality of stops.

Routing optimization system 105 may determine the plurality of routes by including (or inserting) all possible combinations of the plurality of stops. For example, routing optimization system 105 may determine a first route that includes a first stop (e.g., by inserting the first stop), a second route that includes a second stop (e.g., by inserting the second stop), a third route that includes the first stop and the second stop (e.g., by inserting the first stop and the second stop), a fourth route that includes the second stop and a third stop (e.g., by inserting the second stop and the third stop), and so on. Routing optimization system 105 may determine a cost associated with each route of the plurality of routes. Routing optimization system 105 may determine a cost associated with a route based on a distance associated with the route, a travel time associated with the route, a cost (e.g., wages) of a driver associated with the route, a cost of a vehicle associated with driver, among other examples.

The distance associated with the route may include a distance between all consecutive stops of the routes. The travel time associated with the route may include a travel time between all consecutive stops of the routes. Routing optimization system 105 may select a route associated with a lowest cost, out of costs associated with the plurality of routes, as the initial route. In other words, the initial route may be a solution during the first iteration.

In some implementations, routing optimization system 105 may perform one or more additional iterations. For example, during a second iteration, routing optimization system 105 may identify a subset of routes of the plurality of routes that were determined during the first iteration. The subset of routes may correspond to routes associated with lowest costs. For example, routing optimization system 105 may identify the top thirty routes, the top fifty routes, the top hundred routes, among other examples.

Routing optimization system 105 may determine a subsequent plurality of routes by performing the insertions of stops, associated with the subset of routes, on the initial route instead of inserting all possible combinations of the plurality of stops into the initial route (as performed during the first iteration). Determining the subsequent plurality of routes by performing the insertions of stops may be part of an initial heuristic process to determining initial routes. Routing optimization system 105 may determine a cost associated with each route of the subsequent plurality of routes. Routing optimization system 105 may select a route associated with a lowest cost, out of costs associated with the subsequent plurality of routes, as the initial route. Routing optimization system 105 may perform one or more similar iterations.

In some implementations, the initial route may include a portion of the plurality of stops identified in the request. In other words, one or more stops, of the plurality of stops, may not be included in the initial route. The one or more stops may be unassigned stops. By determining the initial route in this manner, routing optimization system 105 may preserve computing resources, storage resources, network resources, among other examples, that would have otherwise been consumed by considering all possible combination of the plurality of stops during each iteration.

Figure 1B:
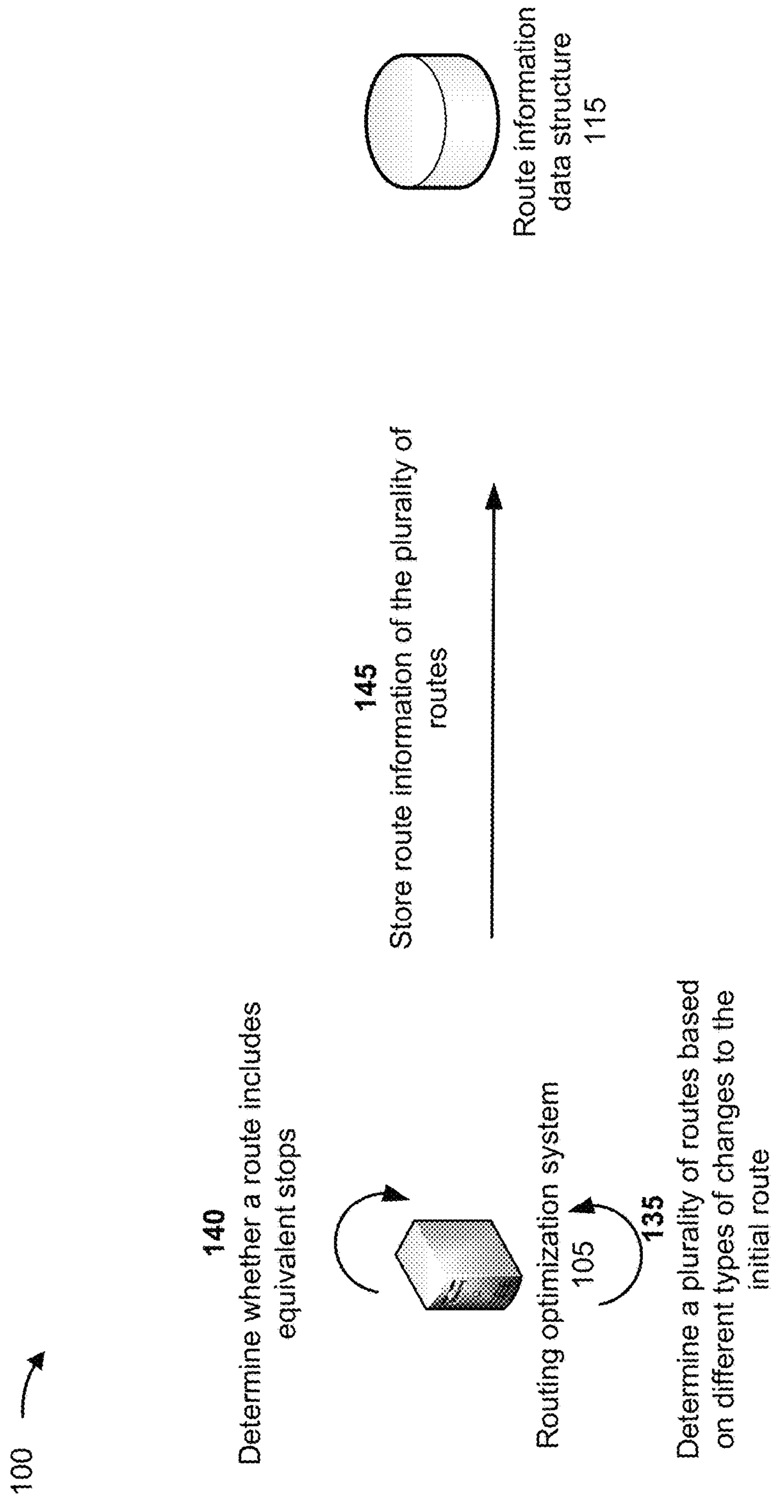

As shown in FIG. 1B, and by reference number 135, routing optimization system 105 may determine a plurality of routes based on different types of changes to the initial route. For example, during a third iteration, routing optimization system 105 may perform changes, of the plurality types of changes discussed above, to determine the plurality of routes. For instance, routing optimization system 105 may perform all possible changes of a first type of change on the initial route to determine a first plurality of routes, perform all possible changes of a second type of change on the initial route to determine a second plurality of routes, and so on.

In some implementations, when determining the plurality of routes, routing optimization system 105 may determine whether a change involves moving a particular stop from a first route to a second route with stops that are not located within a distance threshold of the particular stop. If routing optimization system 105 determines that the stops are not located within the distance threshold of the particular stop, routing optimization system 105 may not perform a change that causes the particular stop to be moved to the second route.

Routing optimization system 105 may not move the particular stop because such a change will not yield an efficient route (e.g., due to the distance between the particular stop and the stops of the second route). By not moving the particular stop, routing optimization system 105 may preserve computing resources, storage resources, network resources, among other examples, that would have otherwise been consumed by performing a change that would yield an efficient route.

As shown in FIG. 1B, and by reference number 140, routing optimization system 105 may determine whether a route includes equivalent stops. Equivalent stops may refer to stops that are consecutive stops in a route (e.g., the initial route), that share a same geographical location, that do not require wait time between the stops, and that are associated with a same type of service (e.g., the stops are all associated with a pickup service, all are associated with a delivery service, among other examples). In other words, the equivalent stops are provided one after another in a same location, therefore leading to no travel time between stops and no distance between stops.

In some implementations, routing optimization system 105 may determine whether a route includes equivalent routes prior to performing particular types of changes that involve changing an order of the equivalent stops. For example, routing optimization system 105 may not perform the particular types of changes on the equivalent stops. Alternatively, routing optimization system 105 may perform the particular types of changes on stops that are not equivalent stops.

Because equivalent stops are provided one after another in a same location and do not involve travel time and distance between stops, rearranging the stops would not provide an improvement of cost for a route that includes the equivalent stops. By not performing the particular types of changes, routing optimization system 105 may preserve computing resources, storage resources, network resources, among other examples, that would have otherwise been consumed by performing the particular types of changes without improving the route.

As shown in FIG. 1B, and by reference number 145, routing optimization system 105 may store route information for the plurality of routes. For example, after determining the plurality of routes, routing optimization system 105 may store the route information for the plurality of routes in route information data structure 115. For instance, routing optimization system 105 may store route information for each route, of the plurality of routes, in a respective entry in route information data structure 115. The route information for a route may include cost information identifying a cost associated with the route, information identifying stops included in the route, information identifying a driver associated with the route, information identifying a vehicle associated with the driver, and/or information indicating whether a type of change associated with the route is a change that involves unassigned stops, among other examples.

In some instances, a change performed during one iteration may be similar to a change performed during a subsequent iteration. Accordingly, by storing the route information as described herein, routing optimization system 105 may preserve computing resources, storage resources, network resources, among other examples, that would have otherwise been consumed by performing the same changes during multiple iterations (e.g., consumed by performing duplicative computations).

Figure 1C:
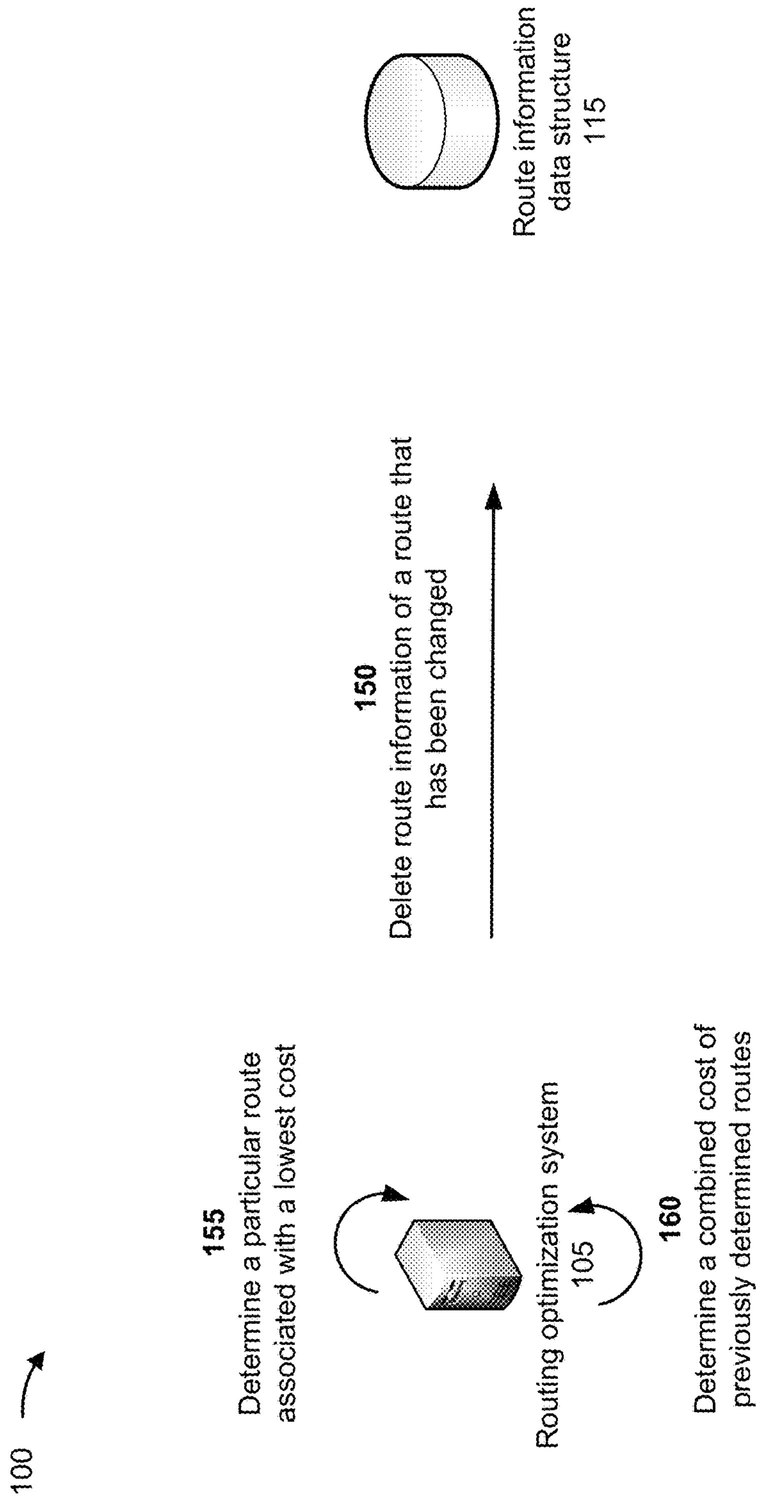

As shown in FIG. 1C, and by reference number 150, routing optimization system 105 may delete route information of a route that has been changed. For example, routing optimization system 105 may determine whether a change, of the plurality of types of changes, has caused a route to be modified. Based on determining that the change has caused the route to be modified, routing optimization system 105 may delete the route information of the route from route information data structure 115.

As shown in FIG. 1C, and by reference number 155, routing optimization system 105 may determine a particular route associated with a lowest cost. In some implementations, routing optimization system 105 may determine a route associated with a lowest cost from the plurality of routes associated with each type of change of the plurality of types of changes. In other words, routing optimization system 105 may determine a solution from the plurality of routes determined during the third iteration.

For example, routing optimization system 105 may determine a first route associated with a lowest cost from the first plurality of routes associated with the first type of change, determine a second route associated with a lowest cost from the second plurality of routes associated with the second type of change, and so on. Routing optimization system 105 may determine the particular route as a route associated with a lowest cost out of the first route, the second route, and so on.

Routing optimization system 105 may determine the first route, the second route, and so on based on a plurality of entries in route information data structure 115 corresponding to the first plurality of routes, the second plurality of routes, and so on. In some implementations, the plurality of entries may be ranked in an order that is based on the costs associated with the plurality of routes. In some situations, the plurality of entries may be ranked in route information data structure 115. Alternatively, routing optimization system 105 (or another device associated with routing optimization system 105) may rank the plurality of entries after the plurality of entries have been obtained from route information data structure 115. In some situations, the plurality of entries may be ranked by increasing cost. For instance, the plurality of entries corresponding to the first plurality of routes may be ranked in an order that is based on the costs associated with the first plurality of routes, the plurality of entries corresponding to the second plurality of routes may be ranked in an order that is based on the costs associated with the second plurality of routes, and so on.

In this regard, the first route may be ranked highest out of the first plurality of routes, the second route may be ranked highest out of the second plurality of routes, and so on. In some implementations, when determining a particular route associated with a lowest cost from a particular plurality of routes associated with a particular type of change, routing optimization system 105 may determine whether an entry, of a plurality of entries in route information data structure 115 associated with the particular plurality of routes, is empty.

If routing optimization system 105 determines that the entry is not empty, routing optimization system 105 may determine that route information data structure 115 stores the route information for all the particular plurality of routes associated with the particular type of change. Accordingly, routing optimization system 105 may determine the particular route based on the plurality of entries corresponding to the particular plurality of routes.

If routing optimization system 105 determines that the entry is empty, routing optimization system 105 may determine that route information data structure 115 does not store the route information for all the particular plurality of routes associated with the particular type of change. Accordingly, routing optimization system 105 may determine the route associated with the entry and store the route information for the route in route information data structure 115, in a manner similar to the manner described above. In this regard, routing optimization system 105 may determine the particular route based on all the plurality of entries corresponding to the particular plurality of routes.

As shown in FIG. 1C, and by reference number 160, routing optimization system 105 may determine a combined cost of previously determined routes. For example, routing optimization system 105 may evaluate previously determined routes to determine whether the previously determined routes (or portions of the previously determined routes) may be combined to obtain a combined cost of that is lower than the cost associated with the particular route (e.g., a route associated with a lowest cost after a particular number of iterations). In some implementations, routing optimization system 105 may perform the evaluation periodically (e.g., every 500 iterations, every 1000 iterations, among other examples). Alternatively, routing optimization system 105 may perform the evaluation based on a trigger (e.g., based on detecting an improvement to the particular route has not been identified after a particular number of iterations).

In some implementations, routing optimization system 105 may maintain information regarding routes associated with costs that do not satisfy a cost threshold. In other words, routing optimization system 105 may maintain a pool of acceptable routes. As an example, for three groups of drivers A, B and C and for three stops, a first route may be generated for a driver in group A with the stop sequence (1, 2, 3) which has a first cost (e.g., 50). In this regard, routing optimization system 105 may include information regarding the first route in the pool (e.g., information identifying the stops, information identifying the sequence of the stops, information identifying a cost of the first route, among other examples). A second route may be generated for a driver in group A with the stop sequence (1, 5, 2, 3) which has a second cost (e.g., 60) that exceeds the first cost. In this regard, routing optimization system 105 may include information regarding the second route in the pool in a similar manner.

A third route may be generated for a driver in group A with the stop sequence (2, 3, 1) which has a third cost (e.g., 40) that is less than the first cost and the second cost. In this regard, the pool will be updated with respect to data previously registered for the first route, by remembering that drivers in group A can serve stops (1,2,3) with the third cost (which is less than the first cost recorded in step 1). The combined cost may be determined based on information included in the pool.

In some implementations, routing optimization system 105 may determine the combined cost of two or more routes based on the following integer linear programming problem. As an example, let R be the pool of all the routes, G be the set of all the driver groups, P be the ordered set of all stop priority classes (with the lower values having higher priority), S be the set of all stops, $x_r$ be a variable which is either 0 or 1 depending on whether route r has been chosen in the solution, $y_s$ be a variable which is either 0 or 1 depending on whether stop s is covered by one route in the solution, cost(r) be the cost of route r, stops(r) be the set of stops served by route r, group(r) be the driver group for route r, priority(s) be the priority of stop s, capacity(g) be the number of drivers in driver group g, and served(p) be the number of served stops for every priority class p in the best solution found so far.

The objective function to be minimized is the total cost of all the selected routes using the following equation:

$$\sum_{r \in R} \text{cost}(r) x_r$$

and the constraints are:

that every stop should be served by at most 1 route using the following equation:

$$\sum_{r: s \in \text{stops}(r)} x_r \leq 1 \quad \forall s \in S$$

that stops can be marked as "served" only if there is a route serving the stops using the following equation:

$$y_s \leq \sum_{r: s \in \text{stops}(r)} x_r \quad \forall s \in S$$

that every driver group has a maximum number of vehicles available using the following equation:

$$\sum_{r: \text{group}(r) = g} x_r \leq \text{capacity}(g) \quad \forall g \in G$$

that the solution should serve no less stops than the best solution found so far using the following equation:

$$\sum_{s: \text{priority}(s) \leq p'} y_s \geq \sum_{p \in P: p \leq p'} \text{served}(p) \quad \forall p' \in P$$

As an alternative, one can choose to also add the unassigned penalties in the objective function, changing the first equation to using the following equation:

$$\sum_{r \in R} \text{cost}(r) x_r + \sum_{s \in S} \text{penalty}(s)(1 - y_o)$$

Figure 1D:
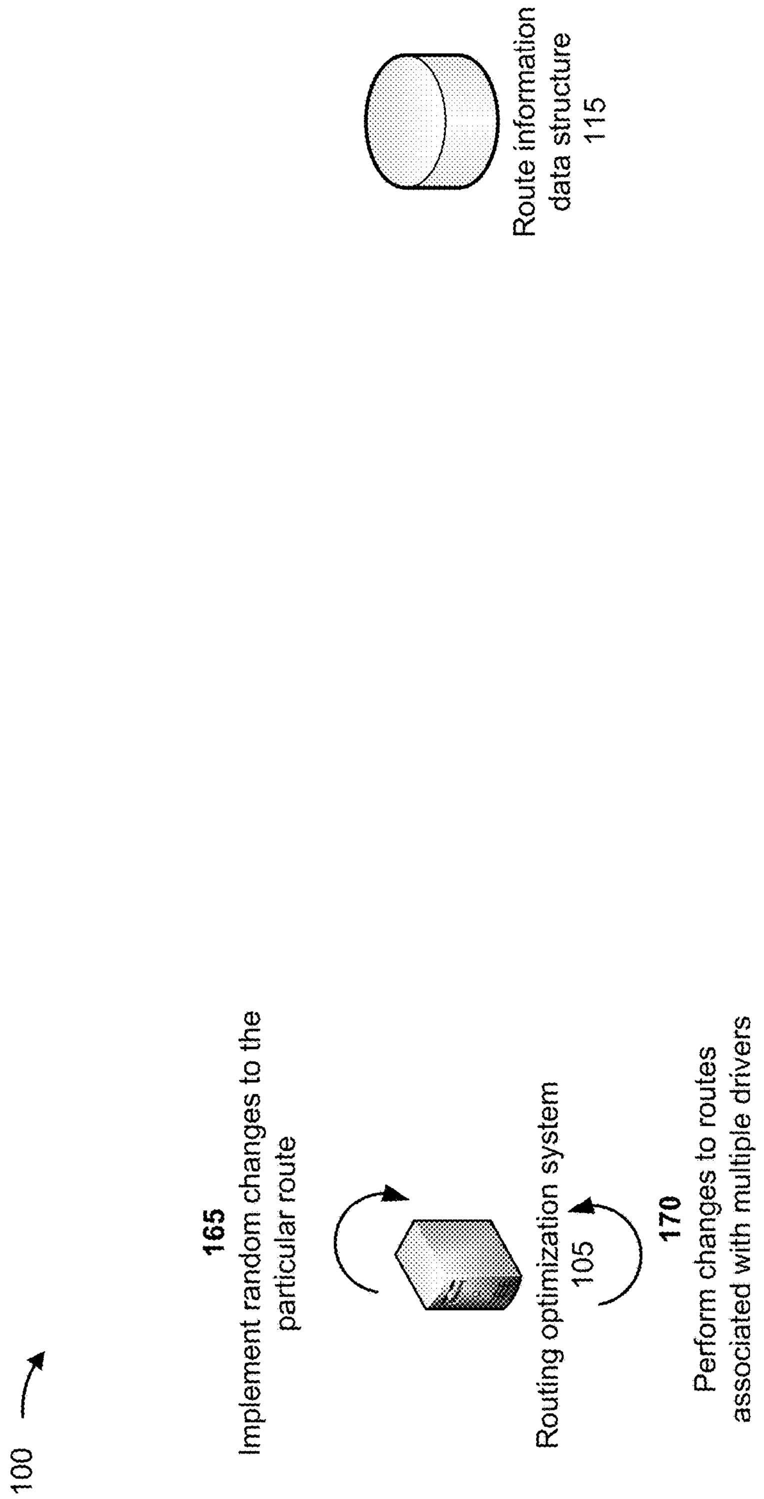

As shown in FIG. 1D, and by reference number 165, routing optimization system 105 may implement random changes to the particular route. For example, routing optimization system 105 may perform a perturbation to change the particular route (e.g., the solution) in a significant way. "Perturbation" may be used to refer to significant changes (e.g., random changes that are significant). By significantly changing the solution, the algorithm may be able to jump to a different part of a solution space, where another solution with a lower cost may be identified.

Routing optimization system 105 may perform two types of perturbations. A first type of perturbation may involve removing a subset of stops of the stops included in the particular route. A second type of perturbation may involve reassigning the subset of stops in a different way. The first type of perturbation may include randomly removing a number of stops (e.g., a fixed number or a fixed portion of the total number of stops), randomly picking a fixed number of drivers and removing all of stops associated with the drivers (e.g., a fixed number or a fixed portion of the drivers), removing a stop and a fixed number of stops adjacent to the stop, and/or a worst removal.

The worst removal involves removal of stops based on a measurement of improvement in cost. During the first phase, for every stop, routing optimization system 105 may compute an objective function change that would occur should such stop be removed from the route. The stops may be ranked, based on a respective objective function change, from worst improvement in cost to best improvement in cost. Finally, starting from the first ranked stop, the first stop is removed in accordance with a fixed probability, subsequently, the second ranked stop is removed in accordance with the same fixed probability, and so on, until a fixed number of stops have been removed.

With respect to the second type of perturbation, the removed stops may be included (or inserted) in routes in a manner similar to the manner described in connection with FIG. 1A. Additionally, routing optimization system 105 may implement a rule that prevents stops from being reassigned to drivers to which the stops were assigned before the first type of perturbation was performed. In some implementations, routing optimization system 105 may perform a perturbation after performing the actions described in connection with reference number 160 of FIG. 1C.

As shown in FIG. 1D, and by reference number 170, routing optimization system 105 may perform changes to routes associated with multiple drivers. For example, routing optimization system 105 may identify a first driver associated with a first previously determined route and a second driver associated with a second previously determined route. Routing optimization system 105 may identify a first continuous sequence of stops in the first previously determined route and a second continuous sequence of stops in the second previously determined route. Routing optimization system 105 may swap the first continuous sequence of stops and the second continuous sequence of stops. In some implementations, the changes herein and the perturbations may be separated by several iterations.

In some implementations, routing optimization system 105 may move the first continuous sequence of stops to the second previously determined route without moving the second continuous sequence of stops to the first previously determined route. For example, each pair of consecutive stops, in the first previously determined route, may be connected by an edge (or an arc). Routing optimization system 105 may identify two longest edges in the first previously determined route and remove the stops associated with the two longest edges.

Such change may result in the first previously determined route being split into three subsequences (some of which might be empty, in case the removed stops are the first stop or the last stop of the first previously determined route). Routing optimization system 105 may discard any subsequence which consists of less than 2 stops. Routing optimization system 105 may insert all remaining subsequences into the second previously determined route. Routing optimization system 105 may insert all remaining subsequences into all possible locations in the second previously determined route.

Figure 1E:
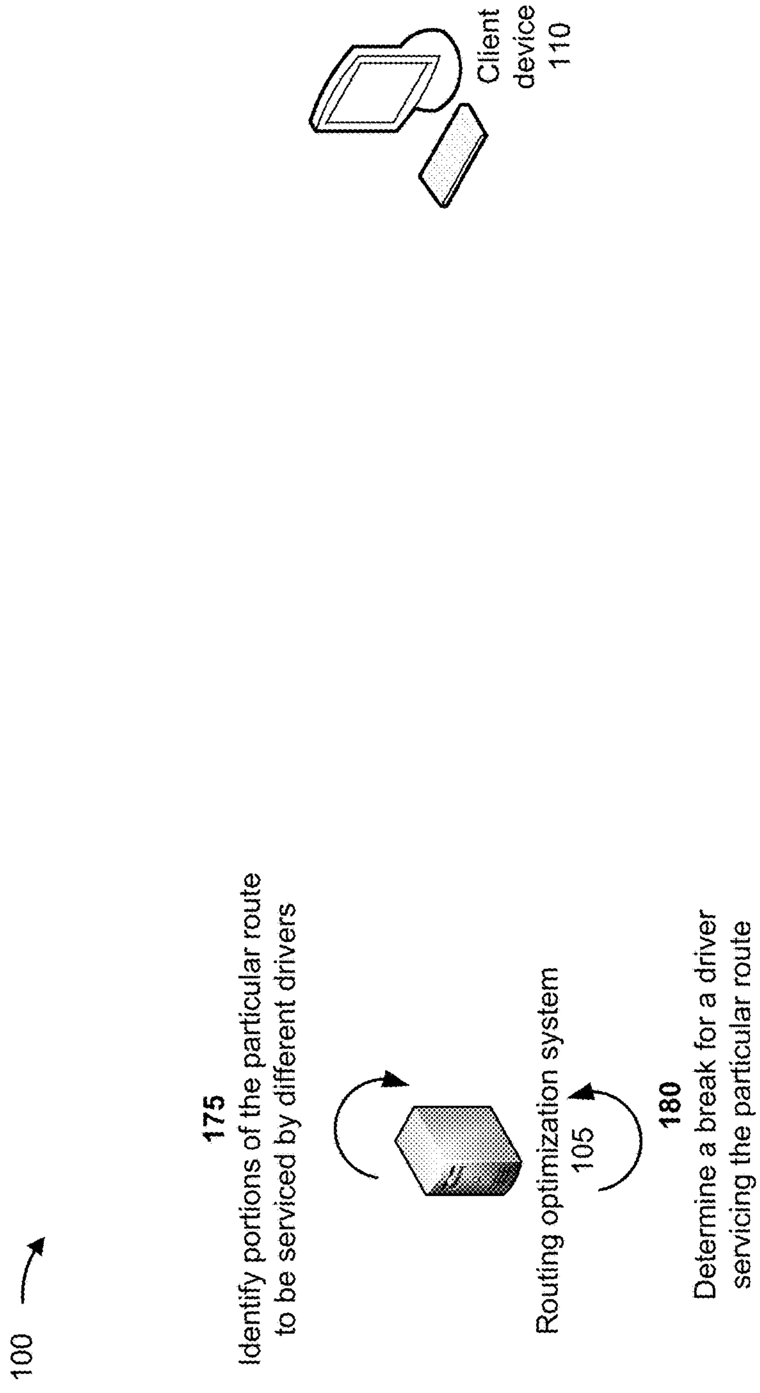

As shown in FIG. 1E, and by reference number 175, routing optimization system 105 may identify portions of the particular route to be serviced by different drivers. For example, routing optimization system 105 may select a solution that ensures that multiple drivers are assigned an equal amount of work, even if the cost of such solution exceeds the cost of a solution in which the workload is not balanced.

In some implementations, routing optimization system 105 may select such solution using a quadratic penalty function for each route cost to ensure that multiple drivers are assigned an equal amount of work. Assuming that $c_i$ is the current cost for the ith route, a cost of such solution may be determined as follows $$c = \sum_i c_i + b(\text{time}_i)^2$$

In this regard, the cost for every route is independent from the cost of other routes and thus every route information can be stored in a dedicated data structure as described above in connection with FIG. 1B (reference number 145). Additionally, the cost for a route is always increasing when a working time (associated with the route) increases.

As shown in FIG. 1E, and by reference number 180, routing optimization system 105 may determine a break for a driver servicing the particular route. For example, routing optimization system 105 may determine an arrival time of the driver at a particular stop of the particular route, a wait time of the driver prior to performing a service at the particular stop, a start time for performing the service, and a departure time from the particular stop. Routing optimization system 105 may determine a break time for the driver based on the arrival time, the wait time, the start time, and the departure time.

For example, if the start time occurs after an earliest possible break time for the driver, routing optimization system 105 may determine a break time before the start time. For example, if the arrival time occurs at or prior to the earliest possible break time assigned to the driver, then routing optimization system 105 may assign the break time as the earliest possible break time. If the earliest break time occurs prior to the arrival time and the arrival time occurs at or prior to a latest possible break time assigned to the driver, then routing optimization system 105 may assign the break time to the arrival time.

If the arrival time occurs after the latest possible break time, the break time is assigned on the way to the particular stop. If the start time occurs at or after the earliest possible break time and if the departure time occurs at or after the latest possible break time, then routing optimization system 105 may assign the break time prior to the start time.

Figure 1F:
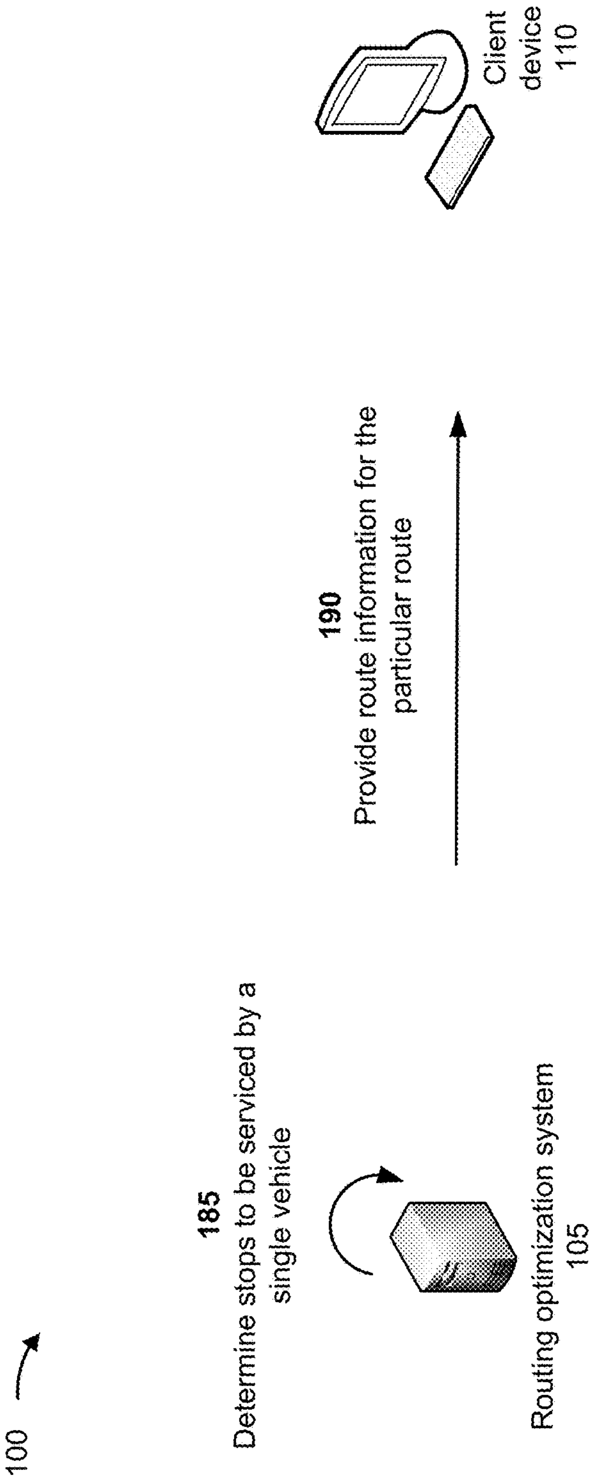

As shown in FIG. 1F, and by reference number 185, routing optimization system 105 may determine stops to be serviced by a single vehicle. For example, assume there are three available drivers associated with three vehicles and four stops to be serviced. The three vehicles may include first two vehicles with enough capacity for one stop, a third vehicle with capacity for two stops. The four stops may include two stops that share the same location and are close to the vehicles, while the other two stops are far away and do not share the same location. The cheapest solution would be to serve both far away stops with the third vehicle, in order to make only one long trip, and serve the stops at the same location with the first two vehicles. However, routing optimization system 105 may select a solution in which the third vehicle services the two stops that share the same location and, accordingly, the first two vehicles would be sent to serve the other two stops.

As shown in FIG. 1F, and by reference number 190, routing optimization system 105 may provide route information for the particular route. For example, routing optimization system 105 may provide the route information to client device 110 based on the request from client device 110. The route information may include a map that includes the route, information identifying the stops included in the particular route, information identifying unassigned stops, information identifying a driver associated with the particular route, information identifying a break assigned to the driver, information identifying the travel distance associated with the particular route, information identifying a time duration associated with the particular route, and/or information identifying a cost associated with the route, among other examples.

By reducing the quantity of computation and reducing the amount of time associated with determining an optimal route as described herein, implementations described herein may preserve computing resources, storage resources, network resources, among other examples, that would have otherwise been consumed by the local search algorithm described above.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
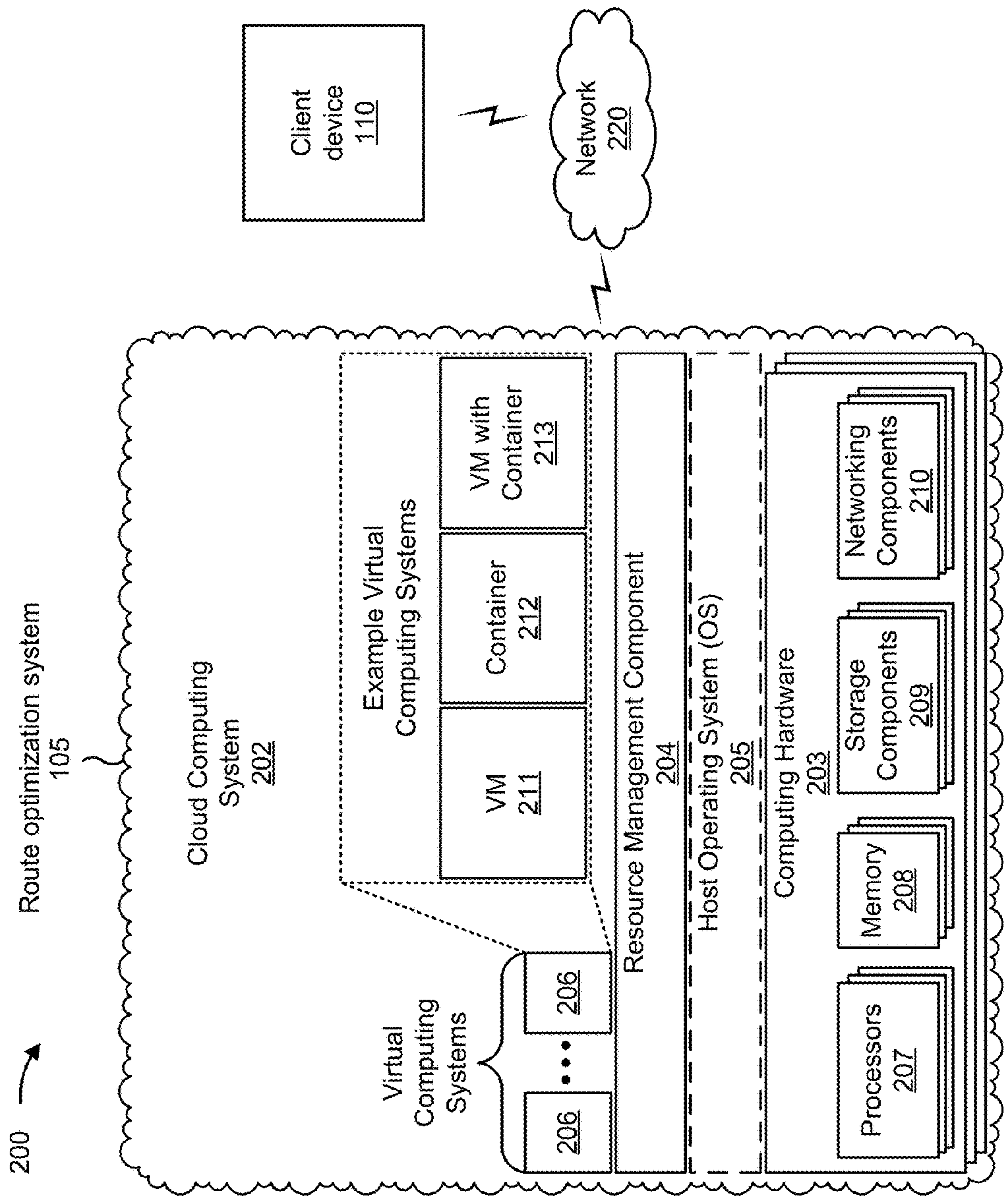
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include routing optimization system 105, which may include one or more elements of and/or may execute within a cloud computing system 202. The cloud computing system 202 may include one or more elements 203-213, as described in more detail below. As further shown in FIG. 2, environment 200 may include client device 110 and a network 220. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, or a hybrid environment 213 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although routing optimization system 105 may include one or more elements 203-213 of the cloud computing system 202, may execute within the cloud computing system 202, and/or may be hosted within the cloud computing system 202, in some implementations, routing optimization system 105 may not be cloud-based (e.g., may be implemented outside of a cloud computing system) or may be partially cloud-based. For example, routing optimization system 105 may include one or more devices that are not part of the cloud computing system 202, such as device 300 of FIG. 3, which may include a standalone server or another type of computing device. Routing optimization system 105 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a private network, the Internet, and/or a combination of these or other types of networks. The network 220 enables communication among the devices of environment 200.

Client device 110 includes one or more devices capable of receiving, generating, storing, processing, and/or providing information associated with route enhancement, as described elsewhere herein. Client device 110 may include a communication device and a computing device. For example, client device 110 may include a wireless communication device, a mobile phone, a user equipment, a laptop computer, a tablet computer, a desktop computer, a wearable communication device, or a similar type of device.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
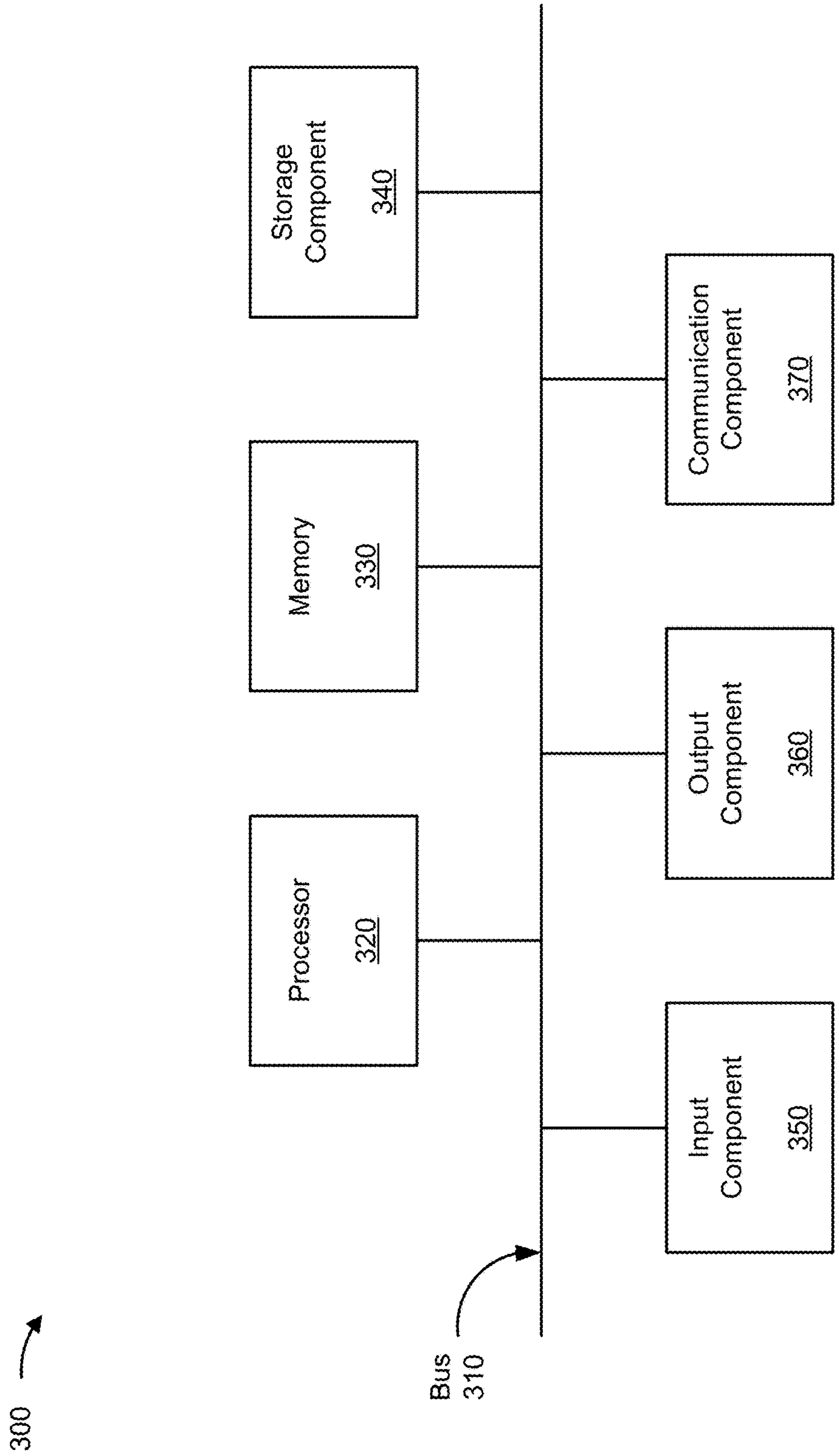
FIG. 3 is a diagram of example components of one or more devices of FIG. 2.

FIG. 3 is a diagram of example components of a device 300, which may correspond to routing optimization system 105 and/or client device 110. In some implementations, routing optimization system 105 and/or client device 110 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hard-wired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
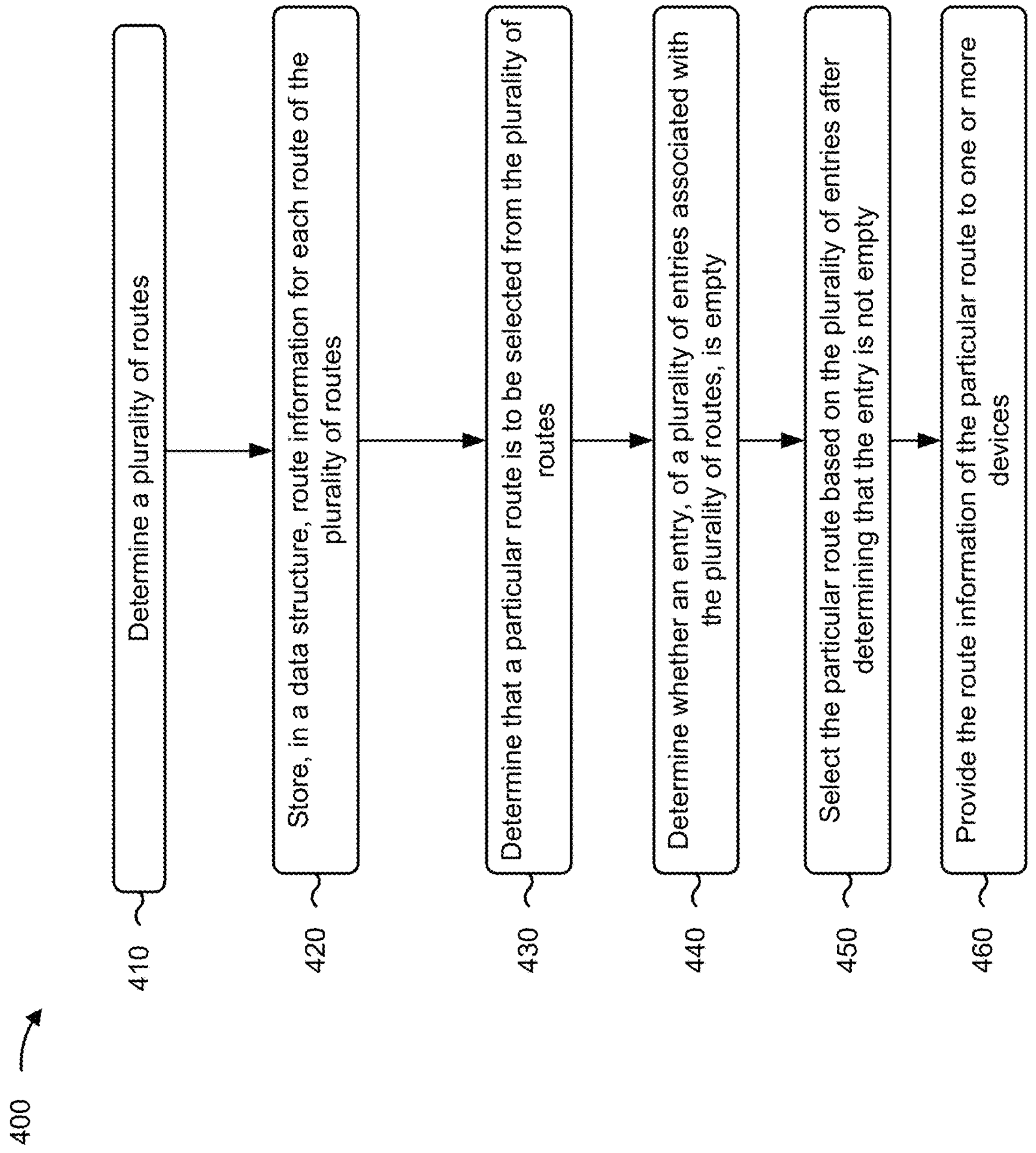
FIG. 4 is a flowchart of an example process relating to route enhancement.

FIG. 4 is a flowchart of an example process 400 relating to route enhancement. In some implementations, one or more process blocks of FIG. 4 may be performed by a routing optimization system (e.g., routing optimization system 105). In some implementations, one or more process blocks of FIG. 4 may be performed by another device or a group of devices separate from or including the routing optimization system, such as a client device (e.g., client device 110). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include determining a plurality of routes based on one or more changes, of a particular type of change, to an initial route that includes a plurality of stops (block 410). For example, the routing optimization system may determine a plurality of routes based on one or more changes, of a particular type of change, to an initial route that includes a plurality of stops, wherein each change, of the one or more changes, generates a respective route of the plurality of routes, as described above. In some implementations, each change, of the one or more changes, generates a respective route of the plurality of routes.

As further shown in FIG. 4, process 400 may include storing, in a data structure, route information for each route of the plurality of routes (block 420). For example, the routing optimization system may store, in a data structure, route information for each route of the plurality of routes, wherein the route information, for each route of the plurality of routes, includes cost information identifying a cost associated with the route, and wherein the route information, for each route of the plurality of routes, is stored in a respective entry of the data structure, as described above. In some implementations, the route information, for each route of the plurality of routes, includes cost information identifying a cost associated with the route. In some implementations, the route information, for each route of the plurality of routes, is stored in a respective entry of the data structure.

As further shown in FIG. 4, process 400 may include determining that a particular route, associated with a lowest cost out of costs associated with the plurality of routes, is to be selected from the plurality of routes (block 430). For example, the routing optimization system may determine that a particular route, associated with a lowest cost out of costs associated with the plurality of routes, is to be selected from the plurality of routes, as described above.

As further shown in FIG. 4, process 400 may include determining whether an entry, of a plurality of entries associated with the plurality of routes, is empty after determining that the particular route is to be selected (block 440). For example, the routing optimization system may determine whether an entry, of a plurality of entries associated with the plurality of routes, is empty after determining that the particular route is to be selected, as described above.

As further shown in FIG. 4, process 400 may include selecting the particular route based on the plurality of entries after determining that the entry is not empty (block 450). For example, the routing optimization system may select the particular route based on the plurality of entries after determining that the entry is not empty, as described above.

As further shown in FIG. 4, process 400 may include providing the route information of the particular route to one or more devices (block 460). For example, the routing optimization system may provide the route information of the particular route to one or more devices, as described above.

In some implementations, the particular type of change involves changing an order of two or more stops of the plurality of stops, and wherein the method further comprises determining whether the two or more stops are equivalent stops by determining whether the two or more stops are consecutive stops, whether the two or more stops are associated with a same location, and whether the two or more stops do not involve a travel time between each of the two or more stops, and performing the particular type of change on the two or more stops based on determining that the two or more stops are not equivalent stops.

In some implementations, the particular type of change involves changes regarding stops of two or more different routes, and wherein the method further comprises determining a distance between a vehicle, associated with a first route of the two or more different routes, and a stop included in a second route of the two or more different routes, determining whether the distance satisfies a distance threshold, and moving the stop from the second route to the first route based on determining that the distance does not satisfy the distance threshold.

In some implementations, process 400 includes determining a combined cost associated with a combination of a first route, of the plurality of routes, and of a second route of the plurality of routes, determining whether the cost associated with the particular route exceeds the combined cost, and selecting the particular route based on determining that the cost associated with the particular route does not exceed the combined cost.

In some implementations, process 400 includes determining a cost associated with a first driver servicing the particular route, determining the costs associated with the first driver and a second driver servicing the particular route, wherein a first traveling cost for the first driver exceeds a combined traveling cost associated with the first driver and the second driver servicing the particular route, determining that the cost associated with the first driver exceeds a combination of the costs associated with the first driver and the second driver, and causing the first driver and the second deliver to service the particular route based on determining that the cost associated with the first driver exceeds the combination of the costs.

In some implementations, process 400 includes receiving stop information identifying a set of stops and driver information identifying a set of drivers, and determining, based on the stop information and the driver information, a group of stops associated with a geographical location and a group of drivers associated with the geographical location, wherein the plurality of stops are included in the group of stops.

In some implementations, process 400 includes determining that a driver is associated with the particular route, determining an arrival time of the driver at a particular stop of the particular route, a wait time of the driver prior to performing a service at the particular stop, a start time for performing the service, and a departure time from the particular stop, and determining a break time for the driver based on the arrival time, the wait time, the start time, and the departure time.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method performed by a routing optimization system, the method comprising:

determining a plurality of routes based on one or more changes, of a particular type of change, to an initial route that includes a plurality of stops, wherein the one or more changes are not performed on a route of the plurality of routes based on determining that the route includes equivalent stops, and wherein each change, of the one or more changes, generates a respective route of the plurality of routes;

storing, in a data structure, route information for each respective route of the plurality of routes, wherein the route information, for each respective route of the plurality of routes, includes cost information identifying a cost associated with the route, and wherein the route information, for each respective route of the plurality of routes, is stored in a respective entry of the data structure;

deleting route information from the plurality of routes based on determining that the one or more changes caused routing of a route associated with the route information to be modified;

determining that a particular route, associated with a lowest cost of costs associated with the plurality of routes, is to be selected from the plurality of routes;

determining whether an entry, of a plurality of entries associated with the plurality of routes, is empty after determining that the particular route is to be selected;

selectively:

generating route information for a first route of the plurality of routes based on determining that the entry is empty, or selecting a second route, of the plurality of routes, as the particular route based on determining that the entry is not empty;

determining a combined cost associated with a combination of a route, of the plurality of routes, and another route of the plurality of routes;

selecting the particular route based on determining that the cost associated with the particular route does not exceed the combined cost;

implementing randomized changes to the selected particular route, wherein the randomized changes to the selected particular route comprise at least one of removing a subset of stops included in the particular route or reassigning the subset of stops in a different way;

determining, based on implementing the randomized changes, another particular route with a lower cost than the particular route;

determining the other particular route to be selected; and providing routing information associated with the other particular route for navigation.

2. The method of claim 1, wherein the particular type of change involves changing an order of two or more stops of the plurality of stops, and wherein the method further comprises:

determining whether the two or more stops are equivalent stops by determining:

whether the two or more stops are consecutive stops, whether the two or more stops are associated with a same location, and whether the two or more stops do not involve a travel time between each of the two or more stops; and performing the particular type of change on the two or more stops based on determining that the two or more stops are not equivalent stops.

3. The method of claim 1, wherein the particular type of change involves changes regarding stops of two or more different routes, and wherein the method further comprises:

determining a distance between a vehicle, associated with a first route of the two or more different routes, and a stop included in a second route of the two or more different routes;

determining whether the distance satisfies a distance threshold; and moving the stop from the second route to the first route based on determining that the distance does not satisfy the distance threshold.

4. The method of claim 1, further comprising:

determining a cost associated with a first driver servicing the particular route;

determining the costs associated with the first driver and a second driver servicing the particular route, wherein a first traveling cost for the first driver exceeds a combined traveling cost associated with the first driver and the second driver servicing the particular route;

determining that the cost associated with the first driver exceeds a combination of the costs associated with the first driver and the second driver servicing the particular route; and causing the first driver and the second driver servicing the particular route to service the particular route based on determining that the cost associated with the first driver exceeds the combination of the costs.

5. The method of claim 1, further comprising:

receiving stop information identifying a set of stops and driver information identifying a set of drivers; and determining, based on the stop information and the driver information, a group of stops associated with a geographical location and a group of drivers associated with the geographical location, wherein the plurality of stops are included in the group of stops.

6. The method of claim 1, further comprising:

determining that a driver is associated with the particular route;

determining an arrival time of the driver at a particular stop of the particular route, a wait time of the driver prior to performing a service at the particular stop, a start time for performing the service, and a departure time from the particular stop; and determining a break time for the driver based on the arrival time, the wait time, the start time, and the departure time.

7. A device, comprising:

one or more processors configured to:

determine a plurality of routes based on one or more changes, of a particular type of change, associated with a plurality of stops, wherein the one or more changes are not performed on a route of the plurality of routes based on determining that the route includes equivalent stops, and wherein each change, of the one or more changes, generates a respective route of the plurality of routes;

store, in a data structure, route information for each respective route of the plurality of routes, wherein the route information, for each respective route of the plurality of routes, includes cost information identifying a cost associated with the route, and wherein the route information, for each respective route of the plurality of routes, is stored in a respective entry of the data structure;

delete route information from the plurality of routes based on determining that the one or more changes caused routing of a route associated with the route information to be modified;

determine that a particular route, associated with a lowest cost of costs associated with the plurality of routes, is to be selected from the plurality of routes;

determine whether an entry, of a plurality of entries associated with the plurality of routes, is empty after determining that the particular route is to be selected;

selectively:

generate route information for a first route of the plurality of routes based on determining that the entry is empty, or select a second route, of the plurality of routes, as the particular route based on determining that the entry is not empty;

determine a combined cost associated with a combination of a route, of the plurality of routes, and another route of the plurality of routes;

select the particular route based on determining that the cost associated with the particular route does not exceed the combined cost;

implement randomized changes to the selected particular route, wherein the randomized changes to the particular route comprise at least one of removing a subset of stops included in the particular route or reassigning the subset of stops in a different way;

determine, based on implementing the randomized changes, another particular route with a lower cost than the particular route;

determine the other particular route to be selected; and provide routing information associated with the other particular route for navigation.

8. The device of claim 7, wherein, to generate the route information for the first route, the one or more processors are further configured to:

determine that the entry is empty based on the one or more changes to the first route;

determine updated route information for the first route based on the one or more changes; and store the updated route information in the entry.

9. The device of claim 7, wherein the one or more processors are further configured to:

rank the plurality of entries in an order that is based on the costs associated with the plurality of routes; and wherein, to select the second route, the one or more processors are further configured to:

select the second route based on the second route being ranked higher than other routes of the plurality of routes.

10. The device of claim 7, wherein the plurality of routes are a first plurality of routes, wherein the one or more changes are one or more first changes, and wherein the one or more processors are further configured to:

perform one or more changes to the second route, wherein, to perform the one or more changes, the one or more processors are further configured to:

randomly remove one or more stops from the second route, or randomly remove one or more drivers associated with the plurality of stops, and determine a second plurality of routes based on one or more second changes, of the particular type of change, involving stops included in the second route.

11. The device of claim 7, wherein the plurality of entries are a first plurality of entries, and wherein the one or more processors are further configured to:

identify first consecutive stops, of the plurality of stops, included in a third route;

identify second consecutive stops, of the plurality of stops, included in a fourth route;

move the second consecutive stops to the third route to generate an updated third route;

move the first consecutive stops to the fourth route to generate an updated fourth route; and store route information for the third route and the fourth route in a second plurality of entries in the data structure.

12. The device of claim 11, wherein the plurality of routes are a first plurality of routes, wherein the third route and the fourth route are a second plurality of routes, and wherein the second route is selected as a route associated with a lowest cost of costs associated with the first plurality of routes, and wherein the one or more processors are configured to:

select the third route as a route associated with a lowest cost of costs associated with the second plurality of routes.

13. A non-transitory computer-readable medium storing a set of instructions, the set of instructions comprising:

one or more instructions that, when executed by one or more processors of a device, cause the device to:

determine a plurality of routes based on one or more changes associated with a plurality of stops, wherein the one or more changes are not performed on a route of the plurality of routes based on determining that the route includes equivalent stops, and wherein each change, of the one or more changes, generates a respective route of the plurality of routes;

store, in a data structure, route information for each respective route of the plurality of routes, wherein the route information, for each respective route of the plurality of routes, includes cost information identifying a cost associated with the route, and wherein the route information, for each respective route of the plurality of routes, is stored in a respective entry of the data structure;

delete route information from the plurality of routes based on determining that the one or more changes caused routing of a route associated with the route information to be modified;

determine that a particular route, associated with a lowest cost of costs associated with the plurality of routes, is to be selected from the plurality of routes;

determine whether an entry, of a plurality of entries associated with the plurality of routes, is empty after determining that the particular route is to be selected; and selectively:

generate route information for a first route of the plurality of routes based on determining that the entry is empty, or select a second route, of the plurality of routes, as the particular route based on determining that the entry is not empty;

determine a combined cost associated with a combination of a route, of the plurality of routes, and another route of the plurality of routes;

select the particular route based on determining that the cost associated with the particular route does not exceed the combined cost;

implement randomized changes to the selected particular route, wherein the randomized changes to the particular route comprise at least one of removing a subset of stops included in the particular route or reassigning the subset of stops in a different way;

determine, based on implementing the randomized changes, another particular route with a lower cost than the particular route;

determine the other particular route to be selected; and provide routing information associated with the other particular route for navigation.

14. The non-transitory computer-readable medium of claim 13, wherein the one or more changes are changes of a particular type of change, wherein the particular type of change involves changes regarding stops of two different routes, and wherein the one or more instructions, when executed by the one or more processors, further cause the device to:

determine a distance between a vehicle associated with a third route of the two different routes and a stop included in a fourth route of the two different routes;

determine whether the distance satisfies a distance threshold; and move the stop from the fourth route to the third route based on determining that the distance does not satisfy the distance threshold.

15. The non-transitory computer-readable medium of claim 13, wherein the one or more changes are changes of a particular type of change, wherein the particular type of change involves changing an order of two or more stops of the plurality of stops, and wherein the one or more instructions, when executed by the one or more processors, further cause the device to:

determine whether the two or more stops are equivalent stops; and perform the particular type of change on the two or more stops based on determining that the two or more stops are not equivalent stops.

16. The non-transitory computer-readable medium of claim 13, wherein the one or more instructions further cause the device to:

rank the plurality of entries in an order that is based on the costs associated with the plurality of routes.

17. The non-transitory computer-readable medium of claim 16, wherein the one or more instructions, that cause the device to select the second route, cause the device to:

select the second route based on the second route being ranked higher than other routes of the plurality of routes.

18. The non-transitory computer-readable medium of claim 13, wherein the one or more instructions further cause the device to:

receive stop information identifying a set of stops and driver information identifying a set of drivers; and determine, based on the stop information and the driver information, a group of stops associated with a geographical location and a group of drivers associated with the geographical location, wherein the plurality of stops are included in the group of stops.

19. The device of claim 7, wherein the routing information includes cost information associated with the particular route.

20. The method of claim 1, wherein the equivalent stops are stops that are provided one after another in a same location.

* * * * *